Oct. 26, 1943.    H. F. JORDAN ET AL    2,332,917
FILTERING APPARATUS
Filed Oct. 17, 1940
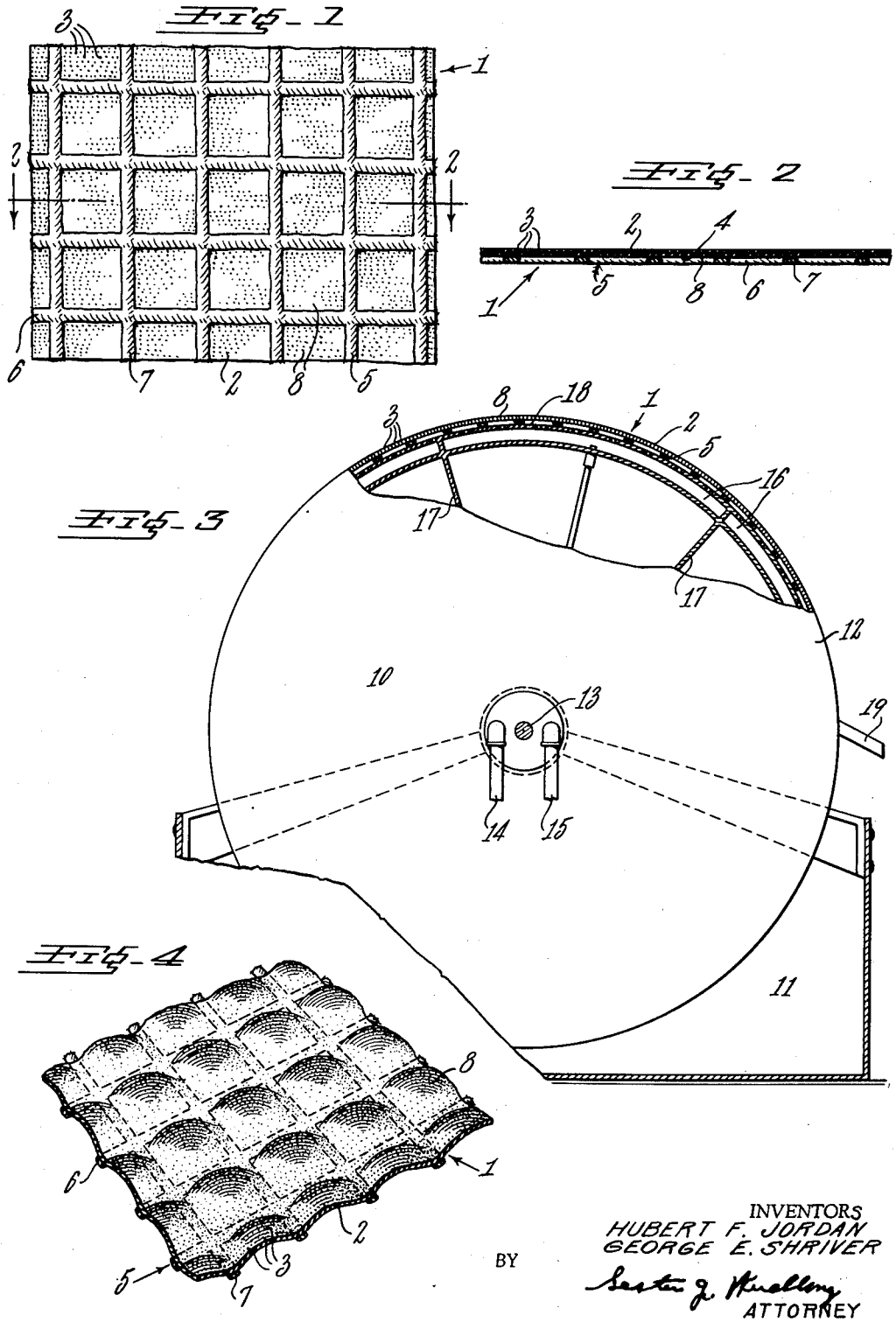
INVENTORS
HUBERT F. JORDAN
GEORGE E. SHRIVER
BY
ATTORNEY Patented Oct. 26, 1943

2,332,917

UNITED STATES PATENT OFFICE 2,332,917

FILTERING APPARATUS

Hubert F. Jordan and George E. Shriver, Nutley, N. J., assignors to United States Rubber Company, New York, N. Y., a corporation of New Jersey Application October 17, 1940, Serial No. 361,542

7 Claims. (Cl. 210—202)

This invention relates to filtering apparatus, and more particularly to a reinforced filter medium which is at least in part elastic.

Various filter media such as closely woven fabric are at present employed to cover rotary drum or leaf filters. The exterior of the drum or leaf is usually covered with a supporting material such as a stiff wire netting or a rigid grid structure, and the filter cloth is removably fastened thereto. It has also been proposed to provide a single-ply perforate rubber sheet in place of the usual filter cloth. It has been pointed out that, because of its elasticity, a perforate rubber sheet has considerable advantage when employed with a rotary drum type of filter wherein segments of the exterior surface are intermittently cleaned by a "blow-off" operation which consists in subjecting the filter medium to a high pressure blast of air from the interior of the drum, thereby stretching the sheet of rubber, or large portions thereof, after a filter cake has been removed therefrom. This procedure of stretching the elastic filter medium enlarges the holes or pores therein so as to facilitate ridding the pores of solid or other material entrained therein. Filter media of this type, however, have the serious draw-back that, after the sheet as a whole or relatively large portions thereof have been repeatedly stretched, the rubber acquires a permanent set, and no longer lies taut on the exterior of the drum. Among other disadvantages, this condition leads to destruction of the filter sheet when it comes in contact with the scraper for removing the filter cake since the scraper tends to catch and tear the perforate rubber sheet. Furthermore, a single-ply rubber filter sheet is easily torn by snagging.

The present invention provides a composite reinforced filtering medium for use in filter presses, centrifugal filters, rotary drum filters of the type described, rotary disc filters, continuous leaf filters, and the like. The filter medium is an integral composite sheet which comprises a flat sheet or ply of thin and finely perforated elastic material such as multi-porous rubber, and a sheet or ply of grid-like open-mesh relatively inextensible material having relatively large meshes, the two plies being integrally secured together throughout their common contacting faces for example by adhesive. When a filter sheet of this type is applied to the supporting surface of a filter so that the ply of open mesh material is inside and the ply of perforate elastic material is in outside and in contact with the liquid to be filtered the two plies in effect form a plurality of areas or webs of multi-porous elastic material supported between integral relatively inelastic supports which define these areas. Consequently when the filter sheet is subjected to a blast of air from the interior of, for example, a rotary filter drum, the stretching of the elastic ply is confined to these localized stretchable areas or webs. The filter medium as a whole does not expand, the expansion being limited to the portions described, with accompanying opening up of the pores or perforations in those portions. These localized areas have a more rapid tendency to snap back into position when the air pressure is released; and the sheet as a whole, not having been expanded, does not have the previously described tendency to sag or bulge. Because the coarse mesh fabric lies between the smooth perforate elastic sheet and and the supporting surface of the filter and is united to the elastic sheet, it supports and restrains the elastic sheet without detracting from the smoothness of the filtering surface and at the same time serves to provide good filtrate drainage. The open mesh ply of inextensible material secured to the rubber sheet is non-absorbent to liquids, both by reason of its large void space, and, preferably, because the strands forming the grid or mesh are impregnated or coated to render them impervious, so that it does not tend to entrain filtrate. Also the filter medium as a whole stays in place, and does not tend to sag or wrinkle, during all stages of a filtering process, including both the actual filtering operations and the intermediate cleaning or other operations. The composite reinforced filtering medium eliminates the necessity for complicated attachment to separately secured backings.

The perforate elastic ply of the filter medium is preferably a thin sheet of vulcanized rubber composition, although other elastic materials, having the proper number of perforations of such dimensions as to retain the finely divided solid material which is to be filtered from associated fluid, may be employed. The term "rubber," therefore, is used in describing the present invention to include not only natural rubber, but similar elastic materials whether derived from natural or synthetic sources. The preferred material for the perforate elastic ply of the composite filter medium is that described in United States Patent No. 2,032,941, in which instance the number of perforations varies within a range on the order of 1,000 to 10,000 perforations per square inch. The perforate sheet material, likewise, is preferably relatively thin, for example, between .005" and .050" although other thicknesses may be desirable particularly when materials other than natural rubber or the solids deposit of a latex composition are used. If desired, the perforate elastic layer of the filter medium may be formed by calendering rubber or other elastic sheet materal to the desired thinness and subsequently punching the perforations therein.

The other ply of the composite filter medium, that is, the backing or reinforcing ply, is preferably open mesh fabric of woven, knitted, tied, or otherwise connected strands, the distance between adjacent strands being preferably between ¼" and 1". In the present description, the terms "open mesh" or "open grid" refer to fabric or other material in which the void areas are substantially of the dimensions described. When the strands are made of organic or inorganic fibrous material, such as woolen, cotton, asbestos or artificial threads, it is preferable that the individual strands be rendered non-absorbent, as by treating them or coating them with rubber or other liquid impervious material. The backing layer, however, may be formed of open mesh metallic netting or gauze, so long as the adjacent wires are relatively flexible and are spaced as above described. It is essential that the strands of the reinforcing or backing layer be relatively inextensible in order to restrain bulging or stretching of the filter medium as a whole and in order to confine any imparted bulging or stretching to adjacent segregated areas of the perforate elastic ply.

The perforate elastic sheet material is secured to the relatively inextensible reinforced backing ply to form the integral filter sheet preferably by an adhesive, which, in most instances, may be a rubber adhesive. When a wire mesh or netting is used as the reinforcing backing, it is preferable to use a rubber-to-metal adhesive in order to achieve and retain the unified nature of the filter medium as a whole. The individual strands of the reinforcing material thus are bridged over by the various webs of the perforate rubber.

A method for making a suitable filter medium involves treating a sheet of open mesh cotton fabric with a rubberizing liquid, as by dipping the mesh into a bath of latex or rubber cement, and allowing it to dry. The adhesive such as a rubber cement or a latex composition may then be applied at least to one face of the open mesh fabric and the fabric may then be rolled onto a layer of perforate rubber sheet material. Preferably, sufficient pressure is applied during the rolling operation in order that one entire face of the fabric will be directly in contact throughout with a face of the perforate rubber ply. When the adhesive is dried the composite filter is ready for operation.

Referring to the accompanying drawing, a certain present preferred embodiment of the invention is illustrated, in which:

Fig. 1 is a plan view of a portion of the composite sheet;

Fig. 2 is a cross-section taken along line 2—2 of Fig. 1;

Fig. 3 is a schematic cross-sectional view of a rotary filter apparatus; and

Fig. 4 is a fragmentary perspective view of the filter medium during the "blow-off" operation.

Referring to Fig. 1 and 2, the filter sheet 1 includes the elastic rubber sheet 2 having a multiplicity of minute perforations 3 extending therethrough. Secured to the rubber ply 2 by an adhesive 4 is the open mesh rubberized fabric 5 comprising longitudinal strands 6 and lateral strands 7. It will be seen from the drawing that the strands 6 and 7 enclose areas 8 on the perforate elastic sheet, wherein stretching may take place.

A typical rotary drum filter 10 is diagrammatically illustrated in Fig. 3. This type of filter is so well known in the art that the description thereof is confined to the broad structural details. The filter includes a tank portion 11, open at the top and adapted to hold a quantity of the material to be filtered. Supported above the tank 11, and extending partly thereinto is a horizontally disposed cylindrical drum 12 which rotates on an axle 13. Pipe connections 14 and 15 are respectively connected to suction applying means and to air pressure means. The drum 12 is divided into a plurality of sector chambers 16 separated by radial partition walls 17, and adapted to be successively connected during rotation to the pipes 14 and 15. The outer circumferential wall 18 of each sector is perforated, so that fluids may pass therethrough to be drawn into each chamber. The filter medium 1 is applied around the outside of the cylinder 12 and is secured thereon in known manner so as to be held taut against the outer walls 18 of the various individual chambers. The open mesh ply of the filter medium is placed adjacent to the perforate walls and the perforate rubber ply constitutes the smooth outer surface of the filtering apparatus when in operation.

When operating the rotary filter 10, the drum 12 is slowly rotated in clockwise direction and the portions dipping into the tank 11 are connected to the suction pipe connection 14, as by a valve arrangement well known in the art. The suction is retained thereby withdrawing the filtrate thereby picking up a layer of the material to be filtered and retaining it on the outer surface of the filter medium. As a chamber of the tank travels toward a scraping knife 19 the filtrate is withdrawn through the filter medium and the particles of filter cake are prevented from passing therethrough because of the minute dimensions of the perforations in the rubber sheet ply of the filter medium 1. Just before a segment of the cylinder reaches the scraping knife, it is disconnected in known manner from the suction pipe 14 and is connected to the air pressure pipe 15, which blows air against a filter medium from the interior of the tank. Sufficient pressure is applied to stretch the elastic areas 8 (see Fig. 4) so that they individually bulge out from the normal outer surface of the filter drum, disengaging the filter cake and opening the pores 3. Fig. 4 also shows the retaining action of the relatively inextensible strands 6 and 7 during the "blow-off" operation. When the portion of the filter has been thus cleaned by an air blast and before it reenters the tank 11 the pressure pipe is disconnected from the appropriate sector and suction pipe 14 is connected, so that suction may again be reapplied for another immersion period of the cycle. Since the interior pressure is withdrawn from beneath the filter medium the elastic areas 8 snap back to their normal position, and do not tend to assume a permanent set or bulge as described above in connection with previous structures.

The open mesh backing ply holds the perforate rubber ply out of contact with the perforated walls of the filter drum so that only a small number of perforations are necessary on those walls in order to take advantage of all the pores or perforations in the rubber ply. The strands being preferably flattened, in some measure, laterally seal off each of the areas 8 so that they operate individually. It is therefore preferable that there be at least one perforation in the cylinder wall for each of the areas 8. It is not necessary, however, that each of the areas 8 be laterally segregated from adjacent areas, in which case there would be some open spaces between the strands of the backing ply and the rubber ply.

Although we have described certain present preferred embodiments of the invention, it is to be understood that the invention may be otherwise embodied within the spirit thereof and within the scope of the appended claims.

Having thus described our invention, what we claim and desire to protect by Letters Patent is:

1. An integral filter sheet comprising a layer of multi-porous elastic material and a layer of open-mesh relatively inelastic material, the strands of the inelastic material being integrally united substantially throughout their lengths to one of the surfaces of the elastic layer, and the strands of the inelastic layer defining and supporting a plurality of webs of the elastic layer, said webs being free between the supporting strands and having a multiplicity of pores.

2. An integral filter sheet comprising a layer of multi-porous elastic material and a layer of open-mesh relatively inelastic material, the strands of the inelastic material being integrally united substantially throughout their lengths to one of the surfaces of the elastic layer, and the strands of the inelastic layer being spaced from about one-fourth inch to about one inch apart and defining and supporting a plurality of webs of the elastic layer, said webs being free between the supporting strands and having a multiplicity of pores.

3. An integral filter sheet comprising a layer of multi-porous elastic material and a layer of open-mesh relatively inelastic non-absorbent material, the strands of the inelastic material being integrally united substantially throughout their lengths to one of the surfaces of the elastic layer, and the strands of the inelastic layer defining and supporting a plurality of webs of the elastic layer, said webs being free between the supporting strands and having a multiplicity of pores.

4. An integral filter sheet comprising in combination a layer of multi-porous elastic material and a layer of open-mesh relatively inelastic material, the strands of the inelastic material being integrally united substantially throughout their lengths to one of the surfaces of the elastic layer, and the strands of inelastic material defining and supporting a plurality of webs of the elastic layer, said webs being free between the supporting strands and having a multiplicity of pores, the sum of the areas of such webs being greater than the sum of the areas covered by the strands.

5. A composite filter medium comprising a sheet of perforate rubber, a sheet of open-mesh fabric plied thereto, and a rubber adhesive securing said sheets together in laminated relationship, the individual threads of said fabric being substantially inextensible and having a rubber coating, and the meshes being covered by webs of the rubber, individual webs each having a multiplicity of perforations.

6. A filter medium comprising a sheet of perforate elastic rubber having the order of 1000 to 10000 perforations per square inch, and a sheet of relatively inextensible open-mesh fabric adhered thereto, the openings of said fabric being defined by strands spaced from one-fourth to one inch in length and width, said strands limiting the elasticity of the rubber sheet along their length, the areas of the rubber sheet defined between said strands being free to stretch individually.

7. Filtering apparatus comprising in combination a filtrate-receiving chamber having a pervious wall, a filter medium covering said wall and means for drawing liquid through said filter medium into said chamber, and for expelling fluid through said filter medium from said chamber, said filter medium comprising a ply of open-mesh inextensible material and a ply of multi-porous elastic material, the strands of the inextensible material being integrally united substantially throughout their lengths to the inside of said ply of elastic material, and the strands of the inextensible materal defining multi-porous areas of the elastic material, the perforations in the elastic material being of sufficiently small dimension to prevent the passage of solid matter therethrough and the inextensible material being integrally united to the perforate material whereby when fluid is expelled from the chamber through the filter medium the filter sheet remains inextensible as a whole and the elastic material stretches in the areas defined by the strands of the inextensible material.

HUBERT F. JORDAN.
GEORGE E. SHRIVER.